United States Patent [19]
Grossman et al.

[11] Patent Number: 5,093,474
[45] Date of Patent: Mar. 3, 1992

[54] PROCESS FOR THE PRODUCTION OF GELATIN FROM FISH SKINS

[75] Inventors: Shlomo Grossman, Ramat Gan; Margalit Bergman, Holon, both of Israel

[73] Assignee: Bar Ilan University, Ramat Gan, Israel

[21] Appl. No.: 338,595

[22] Filed: Apr. 12, 1989

[30] Foreign Application Priority Data

Aug. 4, 1988 [IL] Israel .................................. 87344

[51] Int. Cl.$^5$ .......................... C07K 3/02; C09H 3/00; C09H 3/02
[52] U.S. Cl. .................................. 530/355; 530/354; 530/857; 426/576
[58] Field of Search ................................ 530/355, 856

[56] References Cited

U.S. PATENT DOCUMENTS 2,024,683  5/1932  Epstein et al.

FOREIGN PATENT DOCUMENTS 235635  3/1924  United Kingdom.

OTHER PUBLICATIONS

Japanese Government Patent Office, Patent Abstracts of Japan 11 May 1989, C Field.
Kernot and Speer (Dept. Sci. Ind. Research) 2nd Report of the Adhesive Research Committee, 1926, pp. 23-33.

Primary Examiner—Howard E. Schain
Assistant Examiner—Choon P. Koh
Attorney, Agent, or Firm—Nixon & Vanderhye

[57] ABSTRACT

A process for the production of gelatin from fish skins comprises the steps of: (a) cleaning the skins in order to remove therefrom substantially all superfluous material; (b) treating with dilute aqueous alkali; (c) washing with water until the washing water is substantially neutral; (d) treating with dilute aqueous mineral acid; (e) washing with water until the washing water is substantially neutral; (f) treating with dilute aqueous citric acid and/or another suitable organic acid; (g) washing with water until the washing water is substantially neutral; and (h) extracting with water at elevated temperatures not above about 55° c., the washed citric acid-treated skins. In practice, the present process employs much lower temperatures than known heretofore for the treatment steps, which results in a high quality product (e.g. absence of a fishy smell), compared with the prior art.

26 Claims, No Drawings

PROCESS FOR THE PRODUCTION OF GELATIN FROM FISH SKINS

FIELD OF THE INVENTION

The present invention relates to a process for the production of gelatin from fish skins.

REFERENCE TO COPENDING APPLICATION

Commonly assigned U.S. application Ser. No. 337,008, filed on the same date as the present application, illustrates inter alia a utility of the process of the present invention.

BACKGROUND OF THE INVENTION

Gelatin is a water-soluble proteinaceous substance which finds extensive use in the food, pharmaceutical and photographic industries. It is derived from the breakdown of collagen, a substance of similar composition which is however insoluble, the source of the collagen being preponderantly animal bones, hide pieces and porkskins.

It has been known for many years that gelatin may also be obtained from fish waste, e.g. from fisk skins and other fish offal. Since such waste is available in large quantities from fish canning operations, it would appear to be potentially useful to use it for gelatin production, provided that a technically and economically viable process of manufacture could be found. Part of the technical difficulty concerns the elimination of the unpleasant smell often associated with fish products. It is surprising that, so far as is known to the authors, gelatin from fish waste sources has not found widespread application in the food industry, up to the present time.

Looking at the matter from a different aspect, it may be appreciated that in addition to the fact that a cheap source material exists, it is yet a further advantage of the process of the invention that its product will be acceptable to large segments of the population which, whether for religious, health or merely aesthetic reasons would want to avoid eating products derived from the higher animals. This means that the product of the present process, insofar as it may be applied to the manufacture of food products, will have a potential market larger than that derived from animal wastes.

Kernot and speer (D. S. I. R. 2nd report of the Adhesives Research Committee, 1926, pages 23-33, see also GB 235635), which disclosures are incorporated herein by reference, reviewed and investigated the production of fish glues and gelatins. By way of introduction, it may be mentioned that a superior product may be made by heating isinglass with water, isinglass being the washed and dried inner layer of the sound or swim bladder of certain fish; the product is of course very expensive owing to the restricted nature of its source material. Moving away from this specialized source, the article states that two-thirds of the available gelatin (presumably that contained in fish skins) is extracted by heating with water at a temperature not exceeding 60° C., but where the fat glads are abundant it is essential to remove the fat by a preliminary treatment. The peculiar odor of fish skins is stated to be due to basic nitrogenous compounds and fats containing large percentages of unsaturated acids. In the process disclosed in the article, macerated fish skins (or less preferably, other fish offal) are subjected to the successive steps of washing with water, treatment with dilute alkali, treatment with a weak acid (such as sulfurous acid), and again washing with water, prior to digestion with water at about 60° C. Subsequently the extraction liquors are concentrated and allowed to set, the resulting jellies being cut into cakes and dried. The residues remaining after the extraction are dried in the usual way to prepare meal. The treatment with dilute alkali and with weak acid are each preferably effected by maceration of the skins for 18 to 24 hours, i.e. for 36-48 hours in total.

It is a principal object of the present invention to provide a process for the production from fish skins, of gelatin having a consistently higher quality than that produced from the same source in the prior art.

Still another object of the present invention is to provide such a process which is not energy-intensive.

A further object of the invention is to provide an economically viable process for the production of gelatin from fish skins, in which each stage of a multistage procedure is not unduly protracted.

Another object of the invention is to provide a gelatin product which will be suitable for consumers who wish to avoid the bovine and/or porcine gelatins which are commonly available at the present time.

Yet other objects of the invention will appear from the description which follows.

SUMMARY OF THE INVENTION

There is thus provided in accordance with the present invention, a process for the production of gelatin from fish skins, which comprises the steps of:

(a) cleaning the skins in order to remove therefrom substantially all superfluous material;

(b) treating the cleaned skins with dilute aqueous alkali;

(c) washing the alkali-treated skins with water until the washing water is substantially neutral;

(d) treating the thus-neutralized skins with dilute aqueous mineral acid;

(e) washing the mineral acid-treated skins with water until the washing water is substantially neutral;

(f) treating the thus-neutralized skins with dilute aqueous citric acid;

(g) washing the citric acid-treated skins with water until the washing water is substantially neutral;

(h) extracting with water at elevated temperatures not above about 55° C., the washed citric acid-treated skins; and (i) optionally removing the water to obtain from the thus-produced aqueous gelatin solution, gelatin in the solid state.

DETAILED DESCRIPTION OF THE INVENTION

The superfluous material referred to in step (a) means fat, flesh, bones, scale and so forth. Step (a) may be carried out, for example, by washing with excess water, conveniently under pressure. Prior to step (b), the fish skins are optionally macerated or cut into pieces, though this is not essential.

In step (b), the alkali is conveniently sodium hydroxide, but potassium hydroxide, sodium carbonate or potassium carbonate could also be used.

The use of a mineral acid in step (d) may be regarded as somewhat surprising, since Kernot and Speer (loc cit) use the weak acid sulfurous acid, and imply that use of a mineral acid such as HCl is likely to give a glue rather than gelatin. In the present process, the presently preferred mineral acid is sulfuric acid, but may alternatively be e.g. HCl.

According to the invention, there is included a citric acid treatment step (f), in addition to the mineral acid treatment step. While the reason for the efficacy of citric acid is not known, it has been found by the inventors to be more efficient in giving a high quality product, than when using mineral acid only.

It is believed that other organic acids which are acceptable in food processing and which do not possess or impart an offensive odor, such as for example ascorbic, fumaric, malic, succinic and tartaric acids, could be substituted for at least part of the citric acid in step (f) of the present process.

The washing steps (c), (e) and (g) are carried out in the manner well known in the art, the washings being tested for neutrality and the washing steps being terminated when neutrality is established.

Compared with the prior art, the present invention employs much lower temperatures for the treatment steps, which besides being economical in terms of energy, result in a high quality product. Although Kernot and speer (loc cit) claim that if care is taken, their method can result in "an almost pure gelatin ... entirely free from taste or odor", the inventors have found that carrying out gelatin preparations according to their instructions invariably resulted in a poor quality product with a strong fishy smell.

Thus, in accordance with the present invention, it is preferred that steps (a) to (g) are each effected at ambient temperature $\pm 10°$ C., desirably at a temperature within the range of about 15° to about 27° C., while step (h) is preferably effected at a temperature within the range of about 40° to about 50° C.

As regards the concentrations of the treatment agents in steps (b) and (d), the respective treatments may, e.g., be effected using aqueous alkali and mineral acid having concentrations thereof within the range of about 0.05 to about 0.3% wt./vol. In step (f), there may, e.g., be used aqueous citric acid having a concentration thereof within the range of about 0.5 to about 6.0% wt./vol.

If desired, after washing step (g) and prior to extracting step (h), the skins may be washed with distilled water or substantially ion-free water, in order to remove any residual salts.

The removal of water in optional step (i) may be carried out by any means known to the art, e.g. by simple evaporation, either at near ambient or at elevated temperatures, or by blowing air over the solution, or by freeze-drying.

It is presently contemplated that fish skins derived from any commercially available fish could be used in the present process, the main consideration being availability. However, the presently preferred fish skins are those from Tilapia.

The process of the invention will now be illustrated by a non-limiting Example. The illustrative Example will be followed by a number of Comparative Experiments. It should be noted that Bloom number is an indication of the strength of gels produced. The higher the Bloom number, the stronger the gel.

EXAMPLE 50 g. of skins from Tilapia were thoroughly cleaned with excess water to remove superfluous material, and then soaked in $3 \times 700$ ml. 0.2% (wt./vol.) aqueous sodium hydroxide solution, each soaking 40 minutes, total alkali treatment 2 hours. The alkali-treated skins were washed with water until the washings had pH about 7, and were then soaked in $3 \times 700$ ml. 0.2% (wt./vol.) aqueous sulfuric acid solution, each soaking 40 minutes, total mineral acid treatment 2 hours. The mineral acid-treated skins were washed with water until the washings had pH about 7, and were then soaked in $3 \times 700$ ml. 1.0% (wt./vol.) aqueous citric acid solution, each soaking 40 minutes, total citric acid treatment 2 hours. The citric acid-treated skins were washed with water until the washings had pH about 7, and were then subjected to a final wash with distilled water to remove any residual salts.

The thus-treated skins were placed in a vessel containing distilled water controlled at a temperature within the range of 40°-50° C. Following overnight extraction in this manner, the mixture was filtered, centrifuged and then lyophilized until a powder was obtained; the yield was about 7.5 g. A 5% solution was found to have a similar gelling capacity as a similar solution of a commercial gelatin derived from animal sources and marketed in Israel under the trade name "Ardi". The product of this Example was found to have the following properties.

APPEARANCE Excellent, water white, light textured material.

ODOR: Bland to very slight amine odor.

CLARITY: Excellent.

BLOOM (g.): 263 (determined by a modified procedure due to small quantity, but considered accurate).

VISCOSITY (MP): 51.0 (determined at $6\frac{2}{3}\%$ and 60° C., standard Davis Gelatine Test Method).

ASH (%): 0. pH: 3.77. pI: 7.38.

The following Table compares the amino acid distribution (expressed as wt.%) in the protein content of gelatin obtained in accordance with the present invention, with gelatin obtained from pigskin. Among the evident differences between the two cases, the greater hydroxyproline content of the gelatin of the present invention may be particularly noted.

TABLE

| AMINO ACID ANALYSIS | | |
|---|---|---|
| | SOURCE OF GELATIN | |
| AMINO ACID | Tilapia* | Pigskin |
| Aspartic acid | 5.29 | 4.58 |
| Threonine | 2.55 | 1.79 |
| Serine | 3.12 | 3.47 |
| Glutamic acid | 8.85 | 7.21 |
| Alanine | 9.27 | 11.17 |
| Cystine | — | — |
| Valine | 1.32 | 2.59 |
| Methionine | 1.23 | 0.36 |
| Isoleucine | 1.07 | 0.95 |
| Leucine | 2.56 | 2.40 |
| Tyrosine | 0.72 | 0.26 |
| Phenylalanine | 1.97 | 1.36 |
| Histidine | 1.01 | 0.40 |
| Hydroxylysine | 1.27 | 0.64 |
| Ornithine | 0.04 | — |
| Lysine | 3.54 | 2.66 |
| Ammonia | 1.61 | — |
| Arginine | 8.78 | 4.90 |
| Hydroxyproline | 10.31 | 9.07 |
| Proline | 15.05 | 13.19 |
| Glycine | 20.40 | 33.00 |

*product of the above EXAMPLE

COMPARATIVE EXPERIMENT A

The method of Kernot and Speer (loc cit) was employed, using 24 hour incubations with alkali and acid, and extraction at 60°–80° C. The product had a Bloom value of 63 or less and a strong fishy odor.

COMPARATIVE EXPERIMENT B

Repeating the conditions of the above Example, except that the extraction was carried out at above 55° C., resulted in a product having a Bloom value of less than 60.

COMPARATIVE EXPERIMENT C

Repeating the conditions of the above Example, except that the citric acid step was omitted and substituted by absorption on silica, hydroxyapatite or DEAE-cellulose, in an attempt to remove the odor, resulted in a product having a low Bloom value, and from which the odor had not been removed.

COMPARATIVE EXPERIMENT D

Repeating the conditions of the above Example, except that the citric acid step was omitted and substituted by extraction with 1:1 paraffins:benzene, resulted in a product from which the odor had been almost entirely removed, but in which the Bloom value had undesirably decreased.

While the invention has been particularly described with respect to a specified embodiment, it will be evident to those skilled in the art that many variations and modifications are possible. Accordingly, the invention is not to be construed as limited to the embodiment, rather its scope will be defined only with reference to the claims which follow.

We claim:

1. A process for the production of gelatin from fish skins, said gelatin possessing such gelling capacity, appearance, odor, clarity and boom as to render it suitable for human consumption in food products, which comprises the steps of:
    (a) cleaning the skins in order to remove therefrom substantially all superfluous material;
    (b) treating the cleaned skins with dilute aqueous alkali;
    (c) washing the alkali-treated skins with water until the washing water is substantially neutral;
    (d) treating the thus-neutralized skins with dilute aqueous mineral acid selected from hydrochloric and sulfuric acids;
    (e) washing the mineral acid-treated skins with water until the washing water is substantially neutral;
    (f) treating the thus-neutralized skins with dilute aqueous citric acid;
    (g) washing the citric acid-treated skins with water until the washing water is substantially neutral; and
    (h) extracting with water at elevated temperatures not above about 55° C., the washed citric acid-treated skins.

2. A process according to claim 1, wherein said steps (a) to (g) are each effected out at ambient temperature ±10° C.

3. A process according to claim 2, wherein said steps (a) to (g) are each effected at a temperature within the range of about 15 to about 27° C., and step (h) is effected at a tenperature within the range of about 40° to about 50° C.

4. A process according to claim 1, wherein in steps (b) and (d), the respective treatments are effected using aqueous alkali and mineral acid having concentrations thereof within the range of about 0.05 to about 0.3% wt./vol.

5. A process according to claim 4, wherein said steps (a) to (g) are each effected out at ambient temperature ±10° C.

6. A process according to claim 5, wherein said steps (a) to (g) are each effected at a temperature within the range of about 15° to about 27° C., and step (h) is effected at a temperature within the range of about 40° to about 50° C.

7. A process according to claim 1, wherein in step (f), there is used aqueous citric acid having a concentration thereof within the range of about 0.5 to about 6.0% wt./vol.

8. A process according to claim 7, wherein in steps (b) and (d), the respective treatments are effected using aqueous alkali and mineral acid having concentrations thereof within the range of about 0.05 to about 0.3% wt./vol.

9. A process according to claim 8, wherein said steps (a) to (g) are each effected out at ambient temperature ±10° C.

10. A process according to claim 9, wherein said steps (a) to (g) are each effected at a temperature within the range of about 15° to about 27° C., and step (h) is effected at a temperature within the range of about 40° to about 50° C.

11. A process according to claim 1, wherein the alkali is sodium hydroxide and the mineral acid is sulfuric acid.

12. A process according to claim 1, wherein prior to step (b), the fish skins are macerated or cut into pieces.

13. A process according to claim 1, wherein after washing step (g) and prior to extracting step (h), the skins are washed with distilled water or substantially ion-free water, in order to remove any residual salts.

14. A process for the production of gelatin from fish skins, said gelatin possessing such gelling capacity, appearance, odor, clarity and bloom as to render it suitable for human consumption in food products, which comprises the steps of:
    (a) cleaning the skins in order to remove therefrom substantially all superfluous material and macerating or cutting into pieces the cleaned skins;
    (b) treating the skins from step (a) with dilute aqueous alkali of concentration within the range of about 0.05 to about 0.3% wt./vol.;
    (c) washing the alkali-treated skins with water until the washing water is substantially neutral;
    (d) treating the thus-neutralized skins with dilute aqueous mineral acid selected from hydrochloric and sulfuric acids of concentration within the range of about 0.05 to about 0.3% wt./vol.;
    (e) washing the mineral acid-treated skins with water until the washing water is substantially neutral;
    (f) treating the thus-neutralized skins with dilute aqueous citric acid having a concentration within the range of about 0.5 to about 6.0% wt./vol.;
    (g) washing the citric acid-treated skins with water until the washing water is substantially neutral; and
    (h) extracting with water at elevated temperatures not above about 55° C., the washed citric acid-treated skins;
provided that said steps (a) to (g) are each effected at a temperature within the range of about 15 to about 27° C., and step (h) is effected at a temperature within the range of about 40° to about 50° C.

15. A process according to claim 14, wherein the alkali is sodium hydroxide and the mineral acid is sulfuric acid.

16. A process according to claim 14, wherein after washing step (g) and prior to extracting step (h), the skins are washed with distilled water or substantially ion-free water, in order to remove any residual salts.

17. A process for the production of gelatin from fish skins, said gelatin possessing such gelling capacity, appearance, odor, clarity and bloom as to render it suitable for human consumption in food products, which comprises the steps of:
 (a) cleaning the skins in order to remove therefrom substantially all superfluous material;
 (b) treating the skins from step (a) with dilute aqueous alkali of concentration within the range of about 0.05 to about 0.3% wt./vol.;
 (c) washing the alkali-treated skins with water until the washing water is substantially neutral;
 (d) treating the thus-neutralized skins with dilute aqueous mineral acid selected from hydrochloric and sulfuric acids of concentration within the range of about 0.05 to about 0.3% wt./vol.;
 (e) washing the mineral acid-treated skins with water until the washing water is substantially neutral;
 (f) treating the thus-neutralized skins with dilute aqueous organic acid comprising at least one member selected from the group consisting of ascorbic, citric fumaric, malic, succinic and tartaric acids, and other organic acids which are acceptable in food processing and which do not possess or impart an offensive odor;
 (g) washing the organic acid-treated skins with water until the washing water is substantially neutral; and
 (h) extracting with water at elevated temperatures not above about 55° C., the washed organic acid-treated skins;
provided that said steps (a) to (g) are each effected at a temperature within the range of about 15° to about 27° C., and step (h) is effected at a temperature within the range of about 40° to about 50° C.

18. A process according to claim 17, wherein the alkali is sodium hydroxide and the mineral acid is sulfuric acid.

19. A process according to claim 17, wherein after washing step (g) and prior to extracting step (h), the skins are washed with distilled water or substantially ion-free water, in order to remove any residual salts.

20. A process according to claim 17, wherein prior to step (b), the cleaned skins from step (a) are macerated or cut into pieces.

21. A process according to claim 1, wherein following step (h), the water is removed from the thus-produced aqueous gelatin solution, to obtain gelatin in the solid state.

22. A process according to claim 14, wherein following step (h), the water is removed from the thus-produced aqueous gelatin solution, to obtain gelatin in the solid state.

23. A process according to claim 17, wherein following step (h), the water is removed from the thus-produced aqueous gelatin solution, to obtain gelatin in the solid state.

24. A process according to claim 1, wherein the following conditions (i) and (ii) apply, namely:
 (i) said step of treating with dilute aqueous alkali is carried out for a total time of 2 hours; and
 (ii) said step of treating with dilute aqueous mineral acid is carried out for a total time of 2 hours.

25. A process according to claim 14, wherein the following conditions (i) and (ii) apply, namely:
 (i) said step of treating with dilute aqueous alkali is carried out for a total time of 2 hours; and
 (ii) said step of treating with dilute aqueous mineral acid is carried out for a total time of 2 hours.

26. A process according to claim 17, wherein the following conditions (i) and (ii) apply, namely:
 (i) said step of treating with dilute aqueous alkali is carried out for a total time of 2 hours; and
 (ii) said step of treating with dilute aqueous mineral acid is carried out for a total time of 2 hours.

* * * * *